US008126807B2

(12) United States Patent
Hawkins et al.

(10) Patent No.: US 8,126,807 B2
(45) Date of Patent: Feb. 28, 2012

(54) CONTROL FEATURES IN A SYSTEM AND METHOD FOR PROCESSING CHECKS AND CHECK TRANSACTIONS

(76) Inventors: Kari Hawkins, Medicine Lake, MN (US); Scott Reid, Maple Grove, MN (US)

( * ) Notice: Subject to any disclaimer, the term of this patent is extended or adjusted under 35 U.S.C. 154(b) by 708 days.

(21) Appl. No.: 12/283,524

(22) Filed: Sep. 12, 2008

(65) Prior Publication Data
US 2009/0204540 A1 Aug. 13, 2009

Related U.S. Application Data

(63) Continuation-in-part of application No. 11/699,776, filed on Jan. 30, 2007.

(60) Provisional application No. 60/763,417, filed on Jan. 30, 2006.

(51) Int. Cl.
*G06Q 40/00* (2006.01)
*G06F 17/60* (2006.01)

(52) U.S. Cl. .......................................... 705/45; 235/379
(58) Field of Classification Search ............... 705/35–42
See application file for complete search history.

(56) References Cited

U.S. PATENT DOCUMENTS

| | | | | |
|---|---|---|---|---|
| 5,936,219 | A * | 8/1999 | Yoshida et al. | 235/379 |
| 6,129,272 | A * | 10/2000 | Yoshida et al. | 235/379 |
| 6,390,362 | B1 * | 5/2002 | Martin | 235/379 |
| 7,386,509 | B1 * | 6/2008 | Swift et al. | 705/39 |
| 7,471,818 | B1 * | 12/2008 | Price et al. | 382/137 |
| 7,503,486 | B2 * | 3/2009 | Ahles et al. | 235/380 |
| 7,520,420 | B2 * | 4/2009 | Phillips et al. | 235/379 |
| 7,594,600 | B2 * | 9/2009 | Mueller et al. | 235/375 |
| 7,668,363 | B2 * | 2/2010 | Price et al. | 382/137 |
| 7,757,938 | B2 * | 7/2010 | Richardson et al. | 235/379 |
| 7,978,901 | B1 * | 7/2011 | Barron et al. | 382/138 |
| 2005/0071283 | A1 * | 3/2005 | Randle et al. | 705/75 |
| 2005/0091117 | A1 * | 4/2005 | Phillips et al. | 705/24 |
| 2005/0097050 | A1 * | 5/2005 | Orcutt | 705/45 |
| 2005/0108168 | A1 | 5/2005 | Halpin et al. | |
| 2005/0203857 | A1 * | 9/2005 | Friedman | 705/78 |
| 2006/0112013 | A1 * | 5/2006 | Maloney | 705/45 |
| 2006/0161501 | A1 * | 7/2006 | Waserstein et al. | 705/65 |

(Continued)

OTHER PUBLICATIONS

"Wells Fargo Rolls out Nationwide Lockbox Check Conversion", PR Newswire. New York: Apr. 22, 2003. p. 1.*

(Continued)

*Primary Examiner* — Ella Colbert
*Assistant Examiner* — Mohammed Z Shaikh
(74) *Attorney, Agent, or Firm* — Beck & Tysver PLLC

(57) ABSTRACT

A method of processing paper checks that divides into two independent paths the processing of a data file representing a check and the digital image of the check. The data files and image files are separated both in time and in space, with the data files being used to promptly initiate the transfer of funds to and from appropriate accounts, while the paper checks, at a remote location and typically lagging in time, are scanned to create digital image files and deposited as an image or substitute check if deemed ACH ineligible. The method provides for the comparison of data files to image files, based on MICR information, to find any unmatching or mismatched items for exception processing and a process to manage ACH-ineligible items as an image or substitute check. The process further provides for a trial period protocol for performing image matching on ACH-eligible items during a trial period before sending such transactions for settlement.

9 Claims, 8 Drawing Sheets

U.S. PATENT DOCUMENTS

| | | | |
|---|---|---|---|
| 2006/0182332 A1* | 8/2006 | Weber | 382/139 |
| 2007/0050292 A1* | 3/2007 | Yarbrough | 705/45 |
| 2007/0194102 A1 | 8/2007 | Cohen et al. | |
| 2008/0046334 A1* | 2/2008 | Lee et al. | 705/26 |

OTHER PUBLICATIONS

Anonymous, "Check 21 Resource Document", Business Credit, v. 106, No. 9, pp. 41-47.*

"US Dataworks Announces Three Major Retail Wins; Strengthens Position in Retaile Marketplace", PR Newswire, Oct. 21, 2004, pp. 1-3.*

Nov. 13, 2008 Office Action (U.S. Appl. No. 11/699,776).

Sep. 30, 2009 Office Action (U.S. Appl. No. 11/699,776).

Mar. 1, 2010 Office Action (U.S. Appl. No. 12/317,200).

* cited by examiner

Fig. 5

DO NOT DEPOSIT

Checks have been electronically deposited

COMPANY NAME

Point-of Sale Date: [  /  /  ]

Total Item Count: [ # ]

Total Deposit: [ $ ]

Location (Store #): [ 12345 ]

DDA: [ 99999992 ]

Sign-Off Initials: [  ]

This deposit is proprietary, privileged, confidential, and not to be deposited at any Financial Institution.

If you have received this deposit of checks,

DO NOT DEPOSIT.

For questions, please contact:

TO REORDER, CALL 1.888. AND REFERENCE ORDER #:

CONTROL FEATURES IN A SYSTEM AND METHOD FOR PROCESSING CHECKS AND CHECK TRANSACTIONS

CROSS-REFERENCE TO RELATED APPLICATION

This application is a continuation-in-part of U.S. Ser. No. 11/699,776 filed Jan. 30, 2007, that in turn claims the benefit of U.S. Ser. No. 60/763,417, filed Jan. 30, 2006, which is incorporated herein in its entirety.

FIELD OF THE INVENTION

The present invention relates generally to a system and method of processing checks and check transactions, and more particularly to capturing data from a check at point of sale and later and remotely capturing the image of the check for later matching of the check image with the check data.

BACKGROUND OF THE INVENTION

A. Paper Checks—Functions Served by Paper Checks and How Paper Checks Were Physically Processed Historically Conceptually, a paper check is a vehicle for two things: 1) the data pertinent to the financial transaction; and 2) evidence of the authorization given by the check writer (the "payer") to transfer funds from the payer's account to the designated payee and evidence that the financial information was accurately extracted and recorded from the check.

Historically, the processing of paper check transactions was slow and labor-intensive. When one entity ("payer") paid another entity ("payee") with a paper check, the payee would physically transport the paper check to its own bank, i.e. a bank with which the payee had an account. The payee's bank would process the check, by reading and recording pertinent information about the transaction represented by the check. The payee's bank would sort by payers' bank all of the checks it received within a given period and physically transport those checks to the payers' banks. The payer bank would then read and record the pertinent information about the transaction contained on the check and make the appropriate debit entry to the payer's account. The payer bank would then transfer funds to the payee's bank. Finally, the payee's bank would make the appropriate credit entry to the payee's account.

The physical transport and handling of the paper checks was highly inefficient. Further, both the payer and payee banks had to process the check to collect and record pertinent information, with such double processing is time-consuming and prone to error.

B. Electronic Processing of Check Transaction

The digital age has ushered in a new approach to processing checks. Over the past decade, there has been an industry transition to the electronic processing of checks. Electronic processing involves the recordation of the data (hereafter "transaction information") presented by the check into a digital format which can then be transferred electronically, via the internet or other connection between computer networks, between and amongst independent entities (such as banks and third party processors) without the need to physically transfer the paper check. Transaction information includes:
   the amount of the check;
   the routing number of the bank holding the account on which the check is written;
   the account number of the payer;
   the check number; and
   the date of the check.

By converting the transaction information described by the check into digital form that can be electronically transmitted, it is not always necessary to physically move the paper check from one entity to another to accomplish the proper debiting and crediting of the financial transaction. Electronic transfers of funds from a payer to a payee (or, more precisely, from the account of the payer to the account of the payee) are facilitated by the Automated Clearing House Network (ACH).

There remain, however, a number of functions served by the paper check that are not served by the digital file of the transaction data. For example, the paper check can be used as evidence that the transaction was authorized by the check writer, or conversely that the check was forged. The paper check can be used as proof that there was an error in the capture of transaction information. An endorsement and appropriate stamp(s) on the paper check provides proof that the transaction was paid, thereby acting as a receipt. Further, when a check bounces due to insufficient funds, the paper check can be returned and is proof that the payer owes the payee the designated amount and that the amount has not been paid.

D. Check 21—Image Exchange and Substitute Checks

To accommodate the two competing ideals of getting rid of the burdens of handling paper checks and maintaining a paper document that can be used as proof when necessary, the U.S. federal government recently has passed legislation ("Check Clearing for the 21$^{st}$ Century Act"; hereafter "Check 21") that creates a negotiable instrument called a "substitute check". The substitute check is a paper reproduction that is generated from a stored digital image of the original check. The original check can be scanned and its digital image stored for later use in generating the substitute check. The original check can then be safely destroyed or disposed of.

If a substitute check meets the requirement of the Act, then it is the equivalent of an original paper check. A substitute check has the following physical characteristics:
   contains an image of the front and back of the original check;
   bears a MICR (Magnetic Ink Character Recognition) line containing all the information appearing on the MICR line of the original check;
   conforms, in paper stock, dimension, and otherwise, with generally applicable industry standards; and
   is suitable for automated processing in the same manner as the original check.

E. Point of Purchase (POP) Conversion

The National Automated Clearing House Association (NACHA) develops operating rules and business practices for the Automated Clearing House (ACH) Network and for electronic payments in the areas of Internet commerce, electronic bill and invoice presentment and payment (EBPP, EIPP), e-checks, financial electronic data interchange (EDI), international payments, and electronic benefits transfer (EBT). NACHA's rules have, since 2000, provided for merchants to convert checks to an ACH debit at the point of purchase ("POP conversion"). NACHA's POP conversion rules required merchants to obtain the explicit authorization (i.e. signature) of the consumer to debit their account. The merchant then returns the check to the consumer along with a receipt as required by the NACHA POP rules and regulations. At their option, merchants may keep an image of the check, though POP conversion rules do not require that the merchant keep an image of the check.

F. Back Office Conversion and New NACHA Rules

An alternative method of handling checks has been proposed by NACHA for "back office conversion" (BOC), by which merchants scan their checks in a back office, typically at the end of a day. The scanners capture an image of the check and store the image with the MICR data from the check. A file containing this information is then transferred to a bank or third party payment processor.

NACHA has passed this rule, to accommodate back office conversion, which goes into effect on Mar. 16, 2007. These rules require that a digital image of the front of the check be retained for two years, a notice provided to the consumer at point-of-sale prior to the acceptance of the check of payment, and a receipt provided to the consumer with language as depicted by NACHA and the Federal Reserve under Regulation E.

SUMMARY OF THE INVENTION

The present invention provides a system and method for converting checks to debit entries by which data from the checks is captured at the point of purchase and this data is used to promptly process a deposit to the merchant's account via a third party payment processor (TPPP). Meanwhile, the paper checks collected by the merchant are physically transported from the merchant's place of business to another location for scanning and image capture. Each check image is stored in association with its MICR (Magnetic Ink Character Recognition) line and indexed for future retrieval purposes. The TPPP receives data files from the merchant with the MICR and amount information; the TPPP receives the physical items for scanning and imaging. The TPPP executes a matching operation between the image files and the data files, matching image files with data files based on the MICR, amount, and auxiliary information. Routines are provided for handling image files with no matching data file, data files with no matching image files, and image and data files that find a MICR match but include some discrepancy in their data (e.g. amounts do not match). The non-ACH items that find a successful match, are rendered via image exchange for settlement.

With this system and method of processing checks, the data file is used to promptly process the transaction (and send a credit to the merchant's account) through a third party payment processor. In other words, the third party payment processor can initiate the credit to the merchant's account before the image of the check is matched up to the data file, or perhaps even before the image of the check is made for ACH eligible items (i.e. first-party consumer checks and business checks that do not contain an auxiliary on-us field). In this manner, the third party payment processor can provide the merchant with improved funds availability, while still providing for the storage of the image of the check, and destruction, as required by rules and regulations governing check processing.

This system and method allows for the storage and use (e.g. reporting) of a variety of data regarding each check that may be captured at the point of sale. Such data includes MICR line (routing number, account number, check number), dollar amount, store identifier, lane/cashier identifier, point-of-sale date, and other merchant defined auxiliary information.

The system and method offers the further advantage that merchant's are relieved of the task, cost, and risk of scanning and destroying the paper checks themselves, relying instead on a secure, high-volume scanning operation to obtain digital images of the checks. This method further provides for the digital archiving of check images for prescribed periods of time.

In typical practice, many merchants have more than one location, and the system and method provide for service to more than one location of a merchant. Further, the system and method provide for service to more than one merchant. The system and method for processing check transactions is generally automated to allow processing of a high volume of check transactions from a number of merchants and to accommodate multiple locations of the merchant(s).

A method for processing paper checks according to this system including the steps of: at the merchant's point of purchase, capturing the amount of the transaction and associating that amount in a data file with MICR information for each paper check, or batch of paper checks; sending a batch of said data files representing said batch of checks to a third party payment processor without an image file; physically transporting said batch of checks to a location remote from said merchant; scanning said batch of checks thereby creating a digital image of the checks and, for each said check, associating said image with said check's MICR information; and comparing said image files with said data files to find matches.

For assistance in smoothing the conversion process when a new merchant or new store moves to the described system and method from their previous practice (traditional paper settlement or POP conversion), the system provides a trial protocol for transactions passing through the system during a predetermined trial period.

BRIEF DESCRIPTION OF THE DRAWINGS

An exemplary version of the check processing system and method is shown in the figures wherein like reference numerals refer to equivalent structure throughout, and wherein:

FIG. 5 is a deposit ticket used in the system and method of FIGS. 3 and 4;

DETAILED DESCRIPTION OF PREFERRED EMBODIMENT(S)

Figure 1:
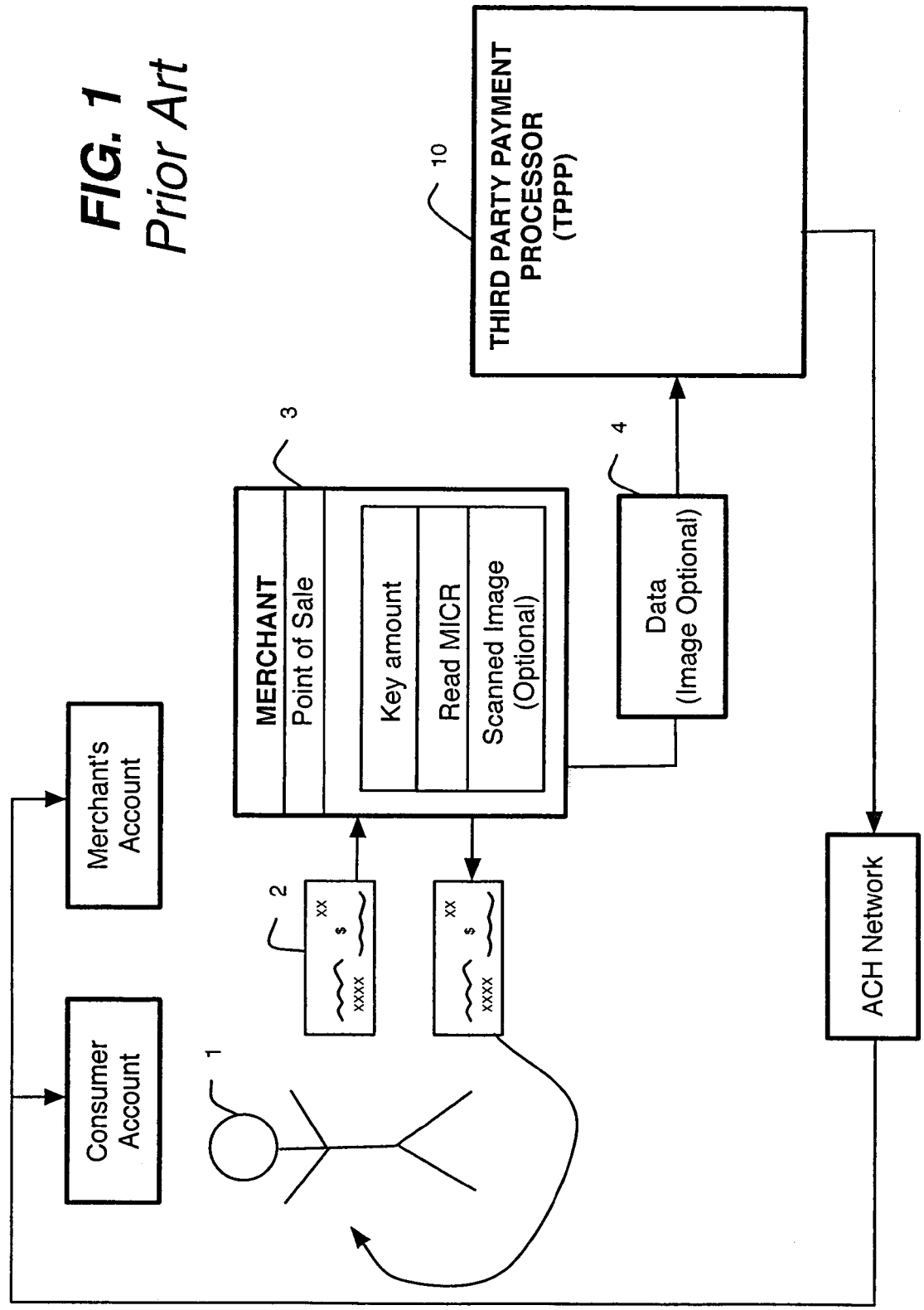
FIG. 1 is a schematic representation of a prior art method of converting a check at the point of purchase (ACH code POP)

FIG. 1 shows a prior art system and method for converting a check at the point of purchase (POP conversion). A consumer 1 pays for goods or services with a check 2. At the point of purchase terminal 3, the merchant keys, or applies amount captured at POS, into the terminal the amount of the purchase. The merchant also passes the check through a MICR (magnetic ink character recognition) reader to capture the consumer's account number, routing number of the financial institution holding the account, and the check number. Optionally, the merchant may also capture a digital image of the check. The merchant determines eligibility based on current NACHA rules, and returns the check to the consumer for the ACH eligible items. The merchant then transfers a file 4 containing this captured information to a third party payment processor (TPPP) 10. Typically, the merchant would periodically (typically daily) send batches of these transaction files. The TPPP would then process the transaction as an ACH payment.

Figure 2:
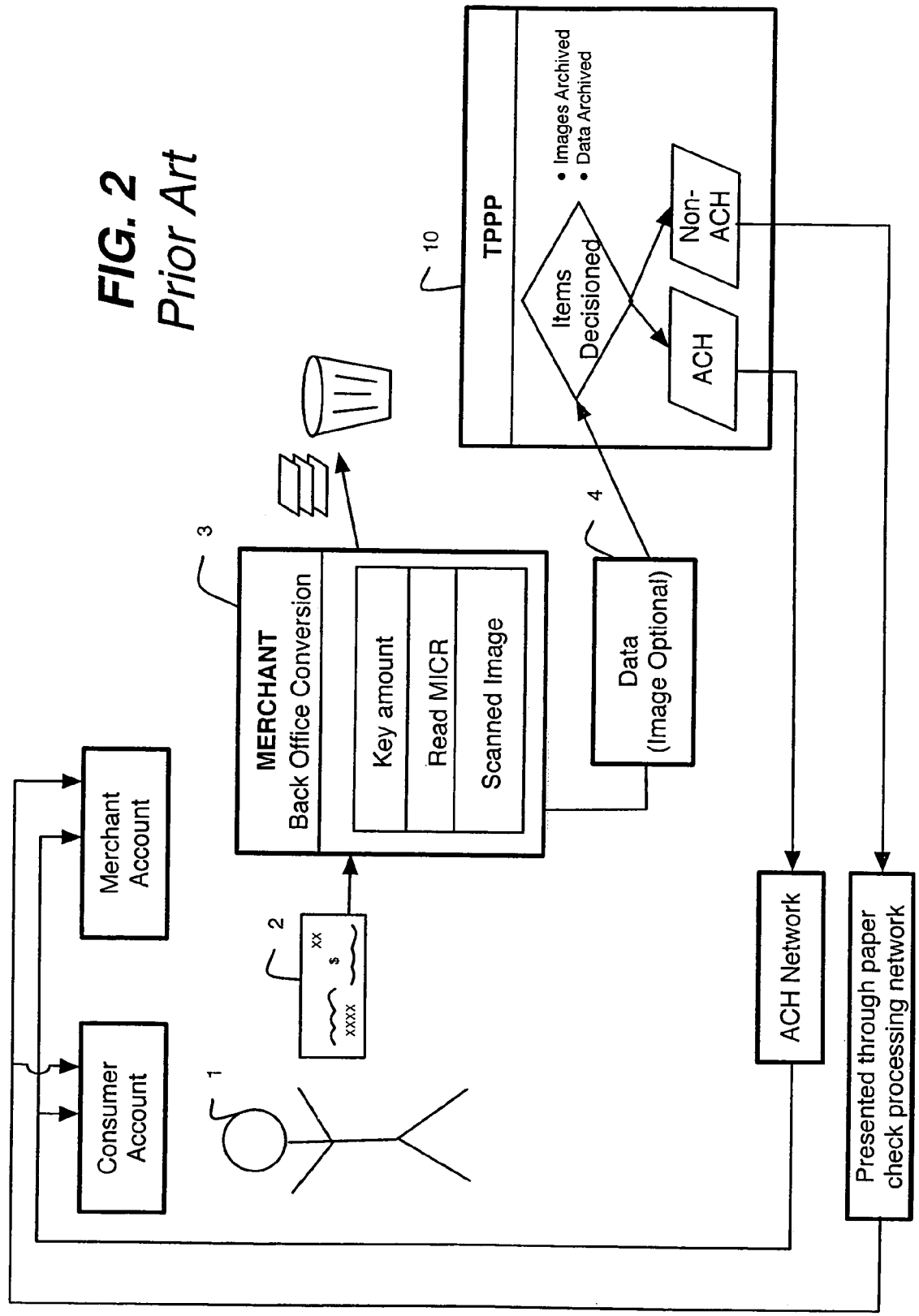
FIG. 2 is a schematic representation of a prior art method of converting a check in the back office (Traditional BOC model)

FIG. 2 shows a prior art system for converting a check in the merchant's back office. With this system, the merchant scans their checks in batches in a back office, instead of at the purchase terminal.

Figure 3:
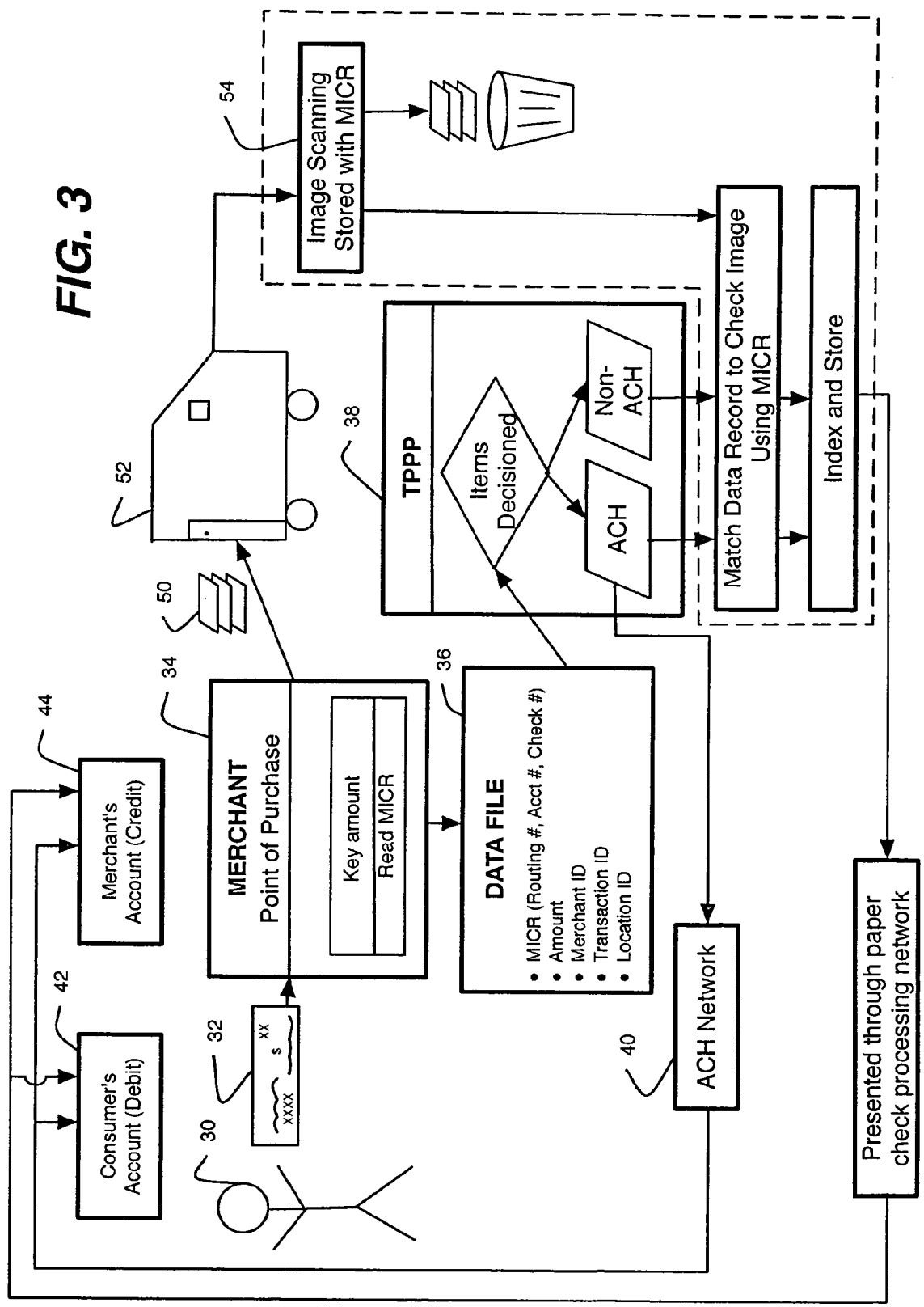
FIG. 3 is a schematic representation of a system and method for processing checks that entails transferring check data independently of a check image, and later connecting check images with their respective check data (Solutran model)
Figure 4:
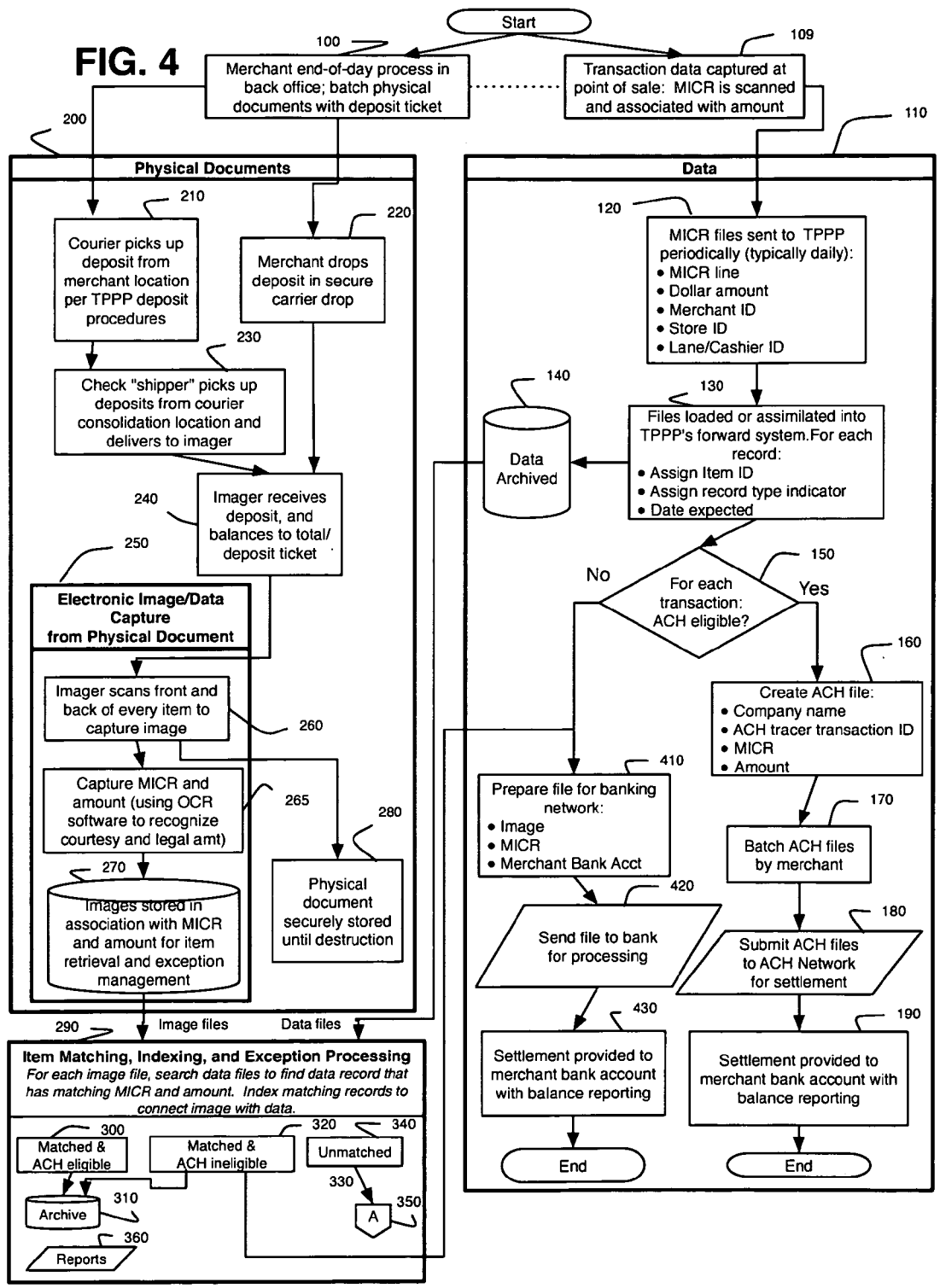
FIG. 4 is a flow chart showing the system and method of FIG. 3, with additional details shown regarding processing of exceptions (Solutran model)
Figure 6:
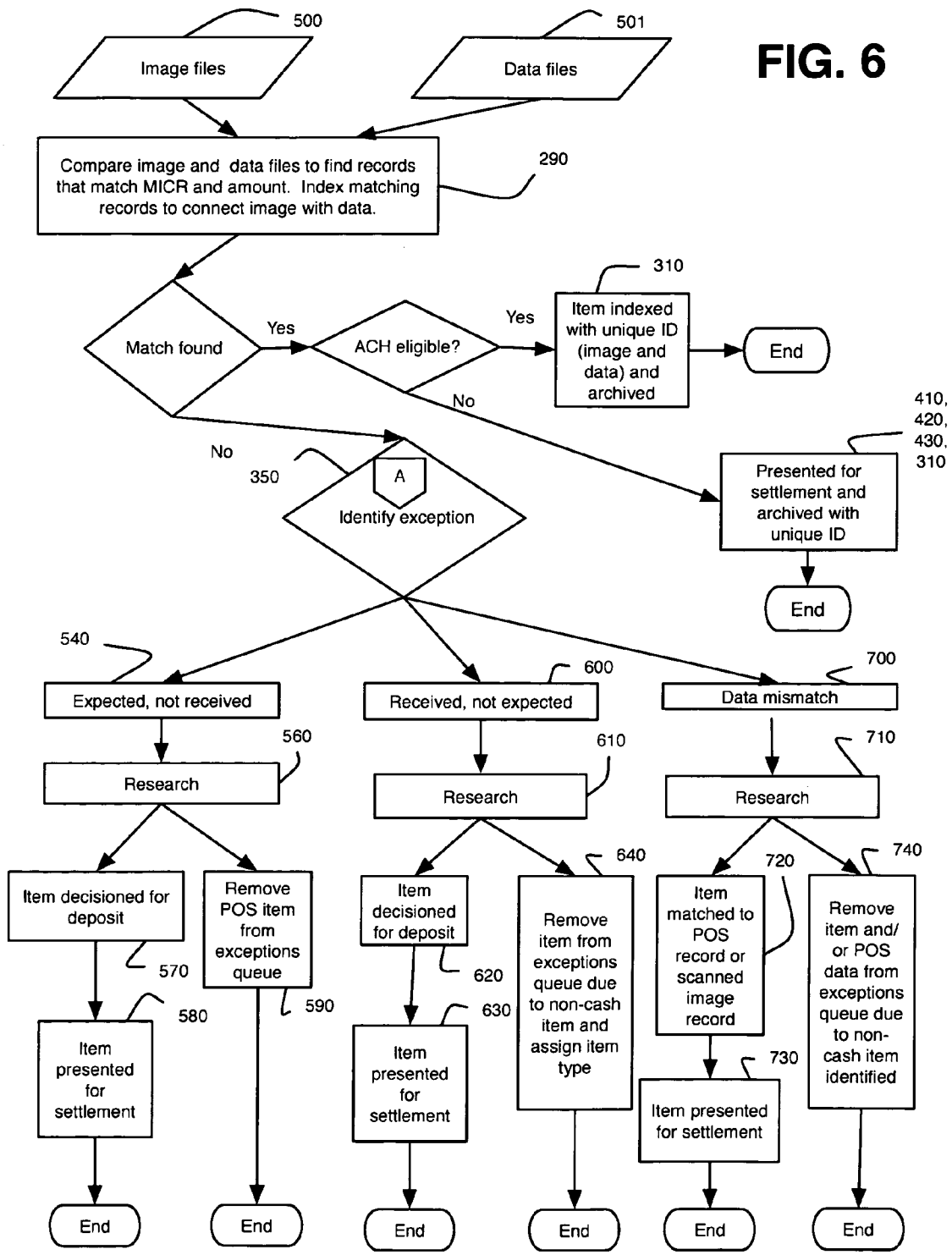
FIG. 6 is a flow chart showing a portion of the system and method of FIG. 4, with details of the process for matching data files to image files (Solutran model)

FIG. 3 shows a system and method of processing checks by which the physical checks and their data files are initially (when they leave the merchant) separated. FIG. 3 depicts the system generally and conceptually. (FIGS. 4 and 6 depict the process, or portions of the process, with greater detail.) Ultimately, the data files are matched up to the image files for reconciliation. More specifically, a consumer 30 pays a merchant with a check 32. At the merchant's point of purchase 34, the cashier keys in the amount of the purchase, or applies amount captured at POS, and passes the check through a MICR reader that reads the MICR line of the check and converts the MICR information to digital form. The MICR reader communicates directly or indirectly with the POS device that captures the amount, creating a digital record for each check transaction.

Periodically (typically daily), the merchant sends a data file 36 to a third party payment processor 38, reflecting a batch of such check transactions that have occurred during the period. More specifically, the merchant computer or server transfers the POS data file 36 to a TPPP computer or server over a computer network via a pre-defined file transfer protocol. The data file 36 contains at least the following information about each transaction: the MICR information (routing number, account number, and check number) and the amount. The data file 36 also includes an identifier for the merchant, location identifier, and a transaction identifier, with at least one of these identifiers being unique or with some combination of these identifiers being unique across the system that typically involves multiple merchants, each with multiple locations and with multiple transactions being processed within the reporting period.

The TPPP decisions the received data files, determining which are eligible for processing through the Automated Clearing House (ACH) 40, and which are not. ACH transactions are passed through the ACH network for processing and appropriate debiting of the consumer's account 42 and the crediting the merchant's account 44, respectively. More specifically, the TPPP computer sends data files reflecting the ACH transactions into the ACH network (i.e. the computers or servers on which the ACH network operates) via pre-defined file transfer protocol.

The merchant 34 periodically physically transfers a batch 50 of its paper checks to a secure courier (e.g. Brinks, UPS or U.S. postal service) 52 for physical delivery to a secure, high-volume scanning operation 54. This scanning service might be provided by the TPPP or may be provided by an independent company, typically in accord with a contractual relationship with the TPPP. The scanning operation 54 scans the checks, creating digital images of the checks that are stored in a digital file in association with their MICR information on the imager's server or computer. Physical checks are securely stored until they are destroyed, based on client specification.

Finally, the image files of the checks are matched to the data files representing the checks using the MICR line, thereby linking the images to the data files. This is achieved by assigning a unique number to each data record, and upon a successful match, indexing the data and image with the unique number for future access in retrieval needs. The MICR line, including the dollar amount, of a check is typically unique and this affords a one-to-one matching based on the MICR line.

This matching operation may be performed on a computer or server operated by the TPPP 38 or by the scanner 54 or by some other entity affiliated with or associated with the TPPP. This matching step is performed to identify any discrepancies between the data files and the image files which represent the checks so that these can be investigated. It will be appreciated that before the matching operation takes place, the matching computer must have access to both the POS data file and the image files created by the imager. When the matching step is performed by the TPPP, the imager transfers the image files from the imager computer to the TPPP computer over a computer network via a pre-defined file transfer protocol. When, alternatively, the matching step is performed by the imager, the TPPP transfers the POS data files from the TPPP computer to the imager computer over a computer network via a pre-defined file transfer protocol. When, as yet another alternative, the matching step is performed by a third party, the TPPP transfers its POS data files and the imager transfers its imager files to the matcher's computer over a computer network via a pre-defined file transfer protocol.

Figure 7:
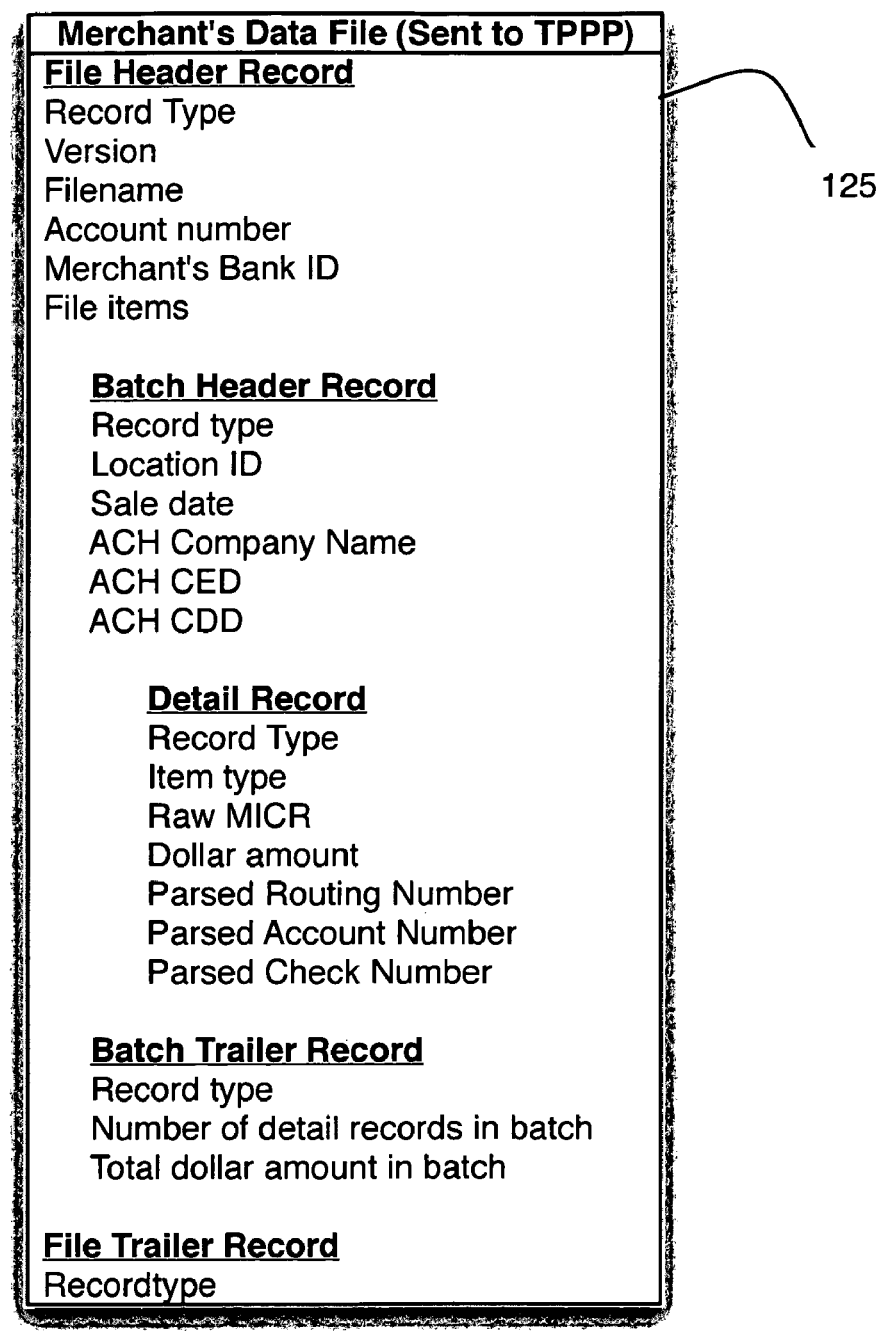
FIG. 7 is an illustration of the format of the data file sent from a merchant to a third party payment processor, according to the system and method of FIGS. 3 and 4.

FIG. 4 shows additional details of portions of the process depicted in FIG. 3 and illustrates the divergent flows for the data collected at the point of sale reflecting the check transactions (110) and for the physical checks and the images of those checks (200). At the point of sale, when a customer presents a transaction document to pay for goods or services, the merchant passes the document through a MICR reader to read the MICR line of the document. In addition, the merchant keys in or otherwise enters an amount for the transaction at the point of sale terminal. The amount and the MICR information are associated in a data file including a merchant identifier, a store identifier, and other various data associated with the transaction A data file containing all of the transactions for a period of time is sent, periodically, typically daily, from the merchant to a third party payment processor (step 120, FIG. 4). The structure of a merchant's data file 125 is illustrated in FIG. 7. The fields identified in this file are as follows:

A File Header Record:
　Record type: a predefined indicator indicating that the record following, until file trailer indication, is a file record
　Version: predefined identifier, identifying a file format version
　Filename: assigned by a merchant
　Account Number: an identifier unique to the merchant, assigned by the TPPP
　Merchant's Bank ID: a prescribed identifier for the merchant's bank
　File items: a count of the number of detail records in this file transmission A Batch Header Record:
　Record type: a predefined indicator indicating that the record following, until batch trailer indication, is a batch record Location: identifier for a store location
Sale Date: date of sale
ACH Company Name: Name of merchant company that will appear on consumer's bank statement (assigned by merchant)
ACH CED: An optional additional field for a merchant description that may appear on consumer's bank statement (assigned by the merchant)
ACH CDD: An optional additional field for merchant's discretionary data (assigned by merchant)
A Detail Record:
   Record type: a predefined indicator indicating that the record following, until detail record trailer indicator or batch trailer record, is a detail record
   Item type: indicates the type of document or transaction (e.g. business check, merchant payroll, non-standard check such as WIC, traveler's check, gift certificate check), personal check or Canadian
   Amount: Numeric dollar/cents amount of transaction
   Raw MICR: MICR line, consisting of digits, spaces and TOAD delimiters)
   Parsed RT: Parsed Routing Number, an optional field used when merchant's MICR reader parses the MICR to identify the routing number
   Parsed ACCT: Parsed Account Number, an optional field used when merchant's MICR reader parses the MICR to identify the consumer's account number
   Parsed CHECK: Parsed Check Number, an optional field used when merchant's MICR reader parses the MICR to identify the check number
A Batch Trailer Record:
   Record type: a predefined indicator indicating a batch trailer record
   Batch Items: number of data records in this batch
   Total Amount: total dollar/cents amount of all detail records in this batch
A File Trailer Record:
   Record type: a predefined indicator indicating a file trailer record This data file is sent via data connection, such as from one computer networked, one way or another, to another computer, via a predefined secure socket layer (SSL) file transfer protocol (FTP) As shown in FIG. 4, the payment processor loads or assimilates the merchant's file into its data system, assigning to each transaction record an item identifier, an identifier of the type of the record and calculates a date that the original item or image is expected for matching and archiving (step 130). These records are then stored, archived, and processed accordingly as explained further (140).

For each transaction record, the payment processor makes a determination as to whether the transaction is eligible for ACH processing or not (150). ACH eligible items include first party consumer checks and small-size corporate checks. (Corporate checks come in two sizes: a "small" size that is approximately the same size as a consumer check, and a larger size.) ACH ineligible items include money orders, WIC checks, travelers checks, large-size corporate checks, government checks, and others as identified under the NACHA rules and regulations. For those records that are ACH eligible, the payment processor creates an ACH file that includes the merchant's name, company entry description, ACH tracer identifier, the MICR line, and the amount of the transaction according to NACHA rules and regulations for ACH BOC processing and various other information. (160).

The payment processor, in typical commercial practice, will provide payment processing services to a number of merchants. On a periodic basis, typically daily, the processor will batch the records of the ACH eligible items by merchant (170), and will submit the batched records in an ACH file to the ACH Network for settlement (180). Thereafter, settlement to the merchant's bank account is made, followed by balance reporting, a confirmation file and a BAI file, typically on the next business day (190).

As noted above, the physical transaction documents that customers present at a point of sale follow a path (200) that is independent of the path (110) of the data reflecting the transaction. At step 100, a merchant gathers a number of transaction documents to be processed. The merchant will do this on a periodic basis, typically at the end of each day. The merchant bundles the transaction documents together and prepares a deposit ticket 201, shown in FIG. 5 to correspond to the bundled documents. The deposit ticket provides spaces for the merchant to summarize the bundled documents with the following data: the point-of-sale date 202, the total item count 203, the total deposit amount 204; an identifier for the store location 205 and an account identifier 206 for the account into which funds should be transferred. Optionally, a pre-printed form, or multiples thereof, are provided to merchants, with the store location 205 and merchant's bank account identifier 206 pre-printed. Further, optionally, the pre-printed form may include a MICR line 207, with a first portion 208 reflecting the location identifier and a second portion 209 reflecting the deposit account number. This MICR aids in later processing of the deposit slip by the check imager. It is a further option, to pre-print the merchant's name on the deposit tickets.

With reference to FIG. 4, the bundled transaction documents are delivered to an image processor. FIG. 4 reflects two examples of how the documents may be transported to the imager. A first option is for a courier to pick up the bundled documents from the merchant (210), and then for a check shipping agent to pick up the bundle from the courier or from the courier's consolidation location and deliver them to the imager (230). An alternate delivery method is for the merchant to drop the bundled documents into a secure carrier (e.g., U.S. Postal Service or United Parcel Service) mail drop (220) for delivery to the imager.

The imager receives the deposited bundle of documents (or typically many deposited bundles of documents, each from one location of a merchant), scans the deposit ticket 201 and uses optical character recognition (OCR) software to interpret the information presented on the ticket 201. (Where a MICR line 207 has been pre-printed on the deposit ticket 201, it may be read by a MICR reader, then scans the ticket and applies OCR, linking the data obtained from the OCR with the MICR-obtained data.) The imager performs a balance to confirm that the amount indicated 204 on the deposit ticket 201, FIG. 5, matches the sum of the documents bundled or included therewith (240, FIG. 4).

As shown in FIG. 4, the imager then captures images of each document (250). More specifically, the imager scans the front and back of every item, captures the MICR and one of or both of the courtesy amount and legal amount using OCR software (265). The front and back images are stored in association with the MICR and amount for item retrieval and exception management (270). The merchant bank account identifier, taken from the deposit ticket that accompanied the batch of checks, is also stored in association with the image, MICR and amount. In accord with federal regulation, the original physical documents must be securely stored until items are destroyed (280).

Next, the process includes an attempt to match each image record to a data record (290), where the data record was generated through path 110 and archived in step 140, described above and includes the MICR information, the dollar amount and an item identifier, merchant bank account, point-of-sale date, and location identifier. More specifically, for each image record, the data files are searched to find a data record with a "matching" MICR and amount. (Alternatively, for each data file, the image files are searched to find a data record with a matching MICR and amount.) "Matching" records are indexed to connect the image with the data.

The system provides for the setting of parameters as to the degree to which the image record and a POS data record must be the same for them to be deemed "matches" or "matching". More specifically, the parameters determine how closely various fields must correlate for records to be deemed "matching". A probability as to likely matching may be determined and used to assist both the identified matches and to aid in processing unmatched records. Fields used in performing comparisons between image records and POS data records include: merchant bank account identifier; sale date; check dollar amount; MICR data (raw or parsed).

For each image record for an ACH eligible item for which a matching data record is found (300), the indexed record (containing the image and data) is archived (310). For each image record for an ACH ineligible item for which a matching data record is found (320), the indexed record (containing the image and data) is archived and an image exchange file is prepared (410) that includes the image, the MICR, the merchant's bank account number and other information as required for image exchange (330). This image exchange file is then transferred via the banking network (420).

Finally, for the ACH-ineligible matched items, settlement is provided to the merchant's bank account based on availability and reported via balance reporting and a non-ACH deposit file, typically the next business day.

Situations in which no match is found for an image record or for a data record after the date that the image from the paper document was expected, are subject to exception processing (350). FIG. 6 shows three categories of exceptions and the steps followed for each type of exception. As noted above, each data record includes a date by which the original item is expected and will be ready for matching and indexing. This projected date takes into account a bit of a lag time for the transport of the physical document. The image record may be missing for any of a number of reasons, including that it has been delayed in transit, that it has "piggy-backed" to another document so that it was missed in the scanning, or that the document has been lost. When the projected date passes, with no image record appearing, that data record is processed as "expected, not received" (540). The situation is then researched (560)- and, based on the results of that result, a decision is made as to what to do with the item.

The researching 560, which is done manually, automatically or via a combination of manually and automatically, is presented to the researcher automatically based on probability matching. Research most typically involves manually querying a database(s) that stores image records and/or POS data records before a final decision has been made. After the research step (560), the item is decisioned for deposit (570). In some cases, the research step will reveal that there does indeed exist a matching image record, and, in such cases, the items will be identified as a match, then presented for settlement (580). In other cases, it will be determined during research that either a POS data record or an image record requires adjustment or repair and that upon making such repair, it can be matched; in such cases the item is then flagged as "matched" and presented for settlement (580). In still other cases, when research reveals that there is no viable matching record, the POS data record can be placed back in the queue of records that will be subject to item by item matching (290) on another day; this will give the image record additional time to appear.

Finally, in some cases, it will be determined that the POS data record does not represent a transaction that ought to be processed. This occurs, for example when an errant POS entry is made and not deleted. Such POS data records will be removed 560 from the exception queue (590) and identified in a database field to indicate that no further attempts will be made to match it.

A second category of exceptions is "received, not expected" (600). These items result when there is an image record for a transaction, but no matching data record. In such cases, the item is researched (610). As with the "expected not received" items, a decision is made (620) as to whether the "received not expected item" ought be processed for settlement, upon finding a match or discovering a repair to be made to the record to allow a match. Such now-matched items are then presented for settlement (630). Items for which no match or repair can be made are removed from the exceptions queue (640). Typically, such unmatchable items occur when a coupon, gift certificate, or non-negotiable paper instrument is errantly included among the scanned document. These records are assigned a type to indicate that they are non-cash items (640) and are not presented for settlement.

A third category of exceptions is "data mismatch" (700) where a match is found based on the MICR information, but some portion of the data from the image record does not match with the data record. For such cases, the records are researched (710) and an appropriate adjustment or correction (720) is made and the transaction is presented for settlement (730). For records for which no match can be found and no repair is called for, the non-matching image record or POS data record is removed from the exception queue (740) and is not presented for settlement.

Yet another step (not pictured) in processing exceptions may include reporting of exceptions by the TPPP to the merchants.

In a preferred method, the merchant's account can be credited at the initiation of the third party processor, based on the data file, before the image of the check is matched to the data file, or perhaps even before the check is imaged for ACH eligible items. ACH ineligible items are rendered processed through the Image Exchange Network upon a successful data and image match.

Trial Protocol for New Merchants or Locations

One practical consideration when a merchant converts to this system and method from their existing BOC or POP conversion systems is the potential for errors, such as inadvertent processing of some check transactions twice. This might happen if a batch of check transactions are processed both by its previous method (traditional paper depository or POP) and also processed by the new system as a result of human error. When such an error happens, it will likely be discovered and can be corrected, though there is cost associated with correcting such an error, particularly for those transactions that are submitted twice, once through ACH and once as a paper deposit. To safeguard against this error, an embodiment of this system and method provides a trial protocol for transactions from a merchant or location for a predetermined time period after it begins service.

During this trial period, ACH-eligible transactions are not immediately processed as ACH transactions (i.e. they will not follow the ordinary steps 160, 170, 180 and 190 of the process shown in FIG. 4 for ACH-eligible transactions). Instead, all transactions (both ACH-ineligible and ACH-eligible) go through the matching protocol (290) described above with respect to FIG. 4. In other words, during the trial period, the transactions are held until they are matched up with an incoming paper document that is evidenced by its associated image file. Should a paper document appear that matches the transaction, it is clear that such transaction was not processed previously according to paper deposit or POP conversion, since under either, the paper document would no longer exist having been deposited via paper or returned to the customer (POP conversion). Further, the delay allows system operators and the merchant time to identify any technical glitches.

Figure 8:
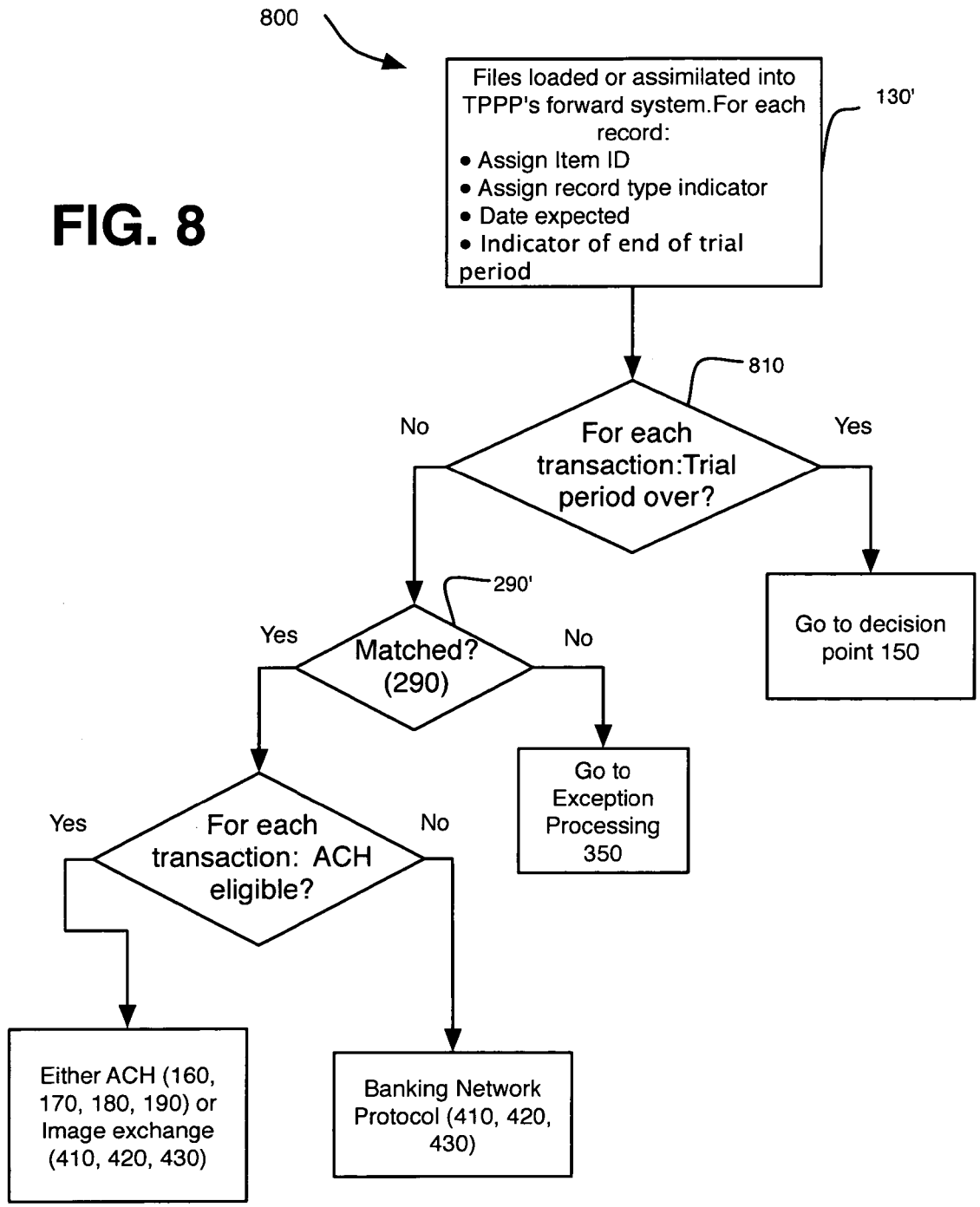
FIG. 8 is a flow chart depicting, in conjunction with FIG. 4, a trial protocol by which ACH-eligible items are submitted to matching rather than being submitted to the ACH network, during a trial period.

FIG. 8 depicts the portion of the process of FIG. 4, to the extent it differs therefrom, that accommodates the trial protocol (800). Automation of this trial protocol (800) for a new merchant or a new store location is accomplished by storing an indicator of the end of a predetermined trial time period in association with each transaction record (130'), along with an Item ID, type indicator and expected date for arrival of the paper document. Thereafter, the records are decisioned (810) to identify transactions that should be subject to follow the trial protocol. Transactions that pass through decisioning 810 at a point in time prior to the end of the trial period are subject to the trial protocol.

The indicator of the end of the trial period may be a date stored in association with the transaction record or a date stored in association with the merchant or store identifier and applied through association to all transaction records associated with the store or merchant. Alternatively, it might be a binary flag.

Automated processing that accommodates a trial protocol proceeds as follows:

i) ACH-eligible transactions that are beyond the trial period (i.e. pass through decision point 810 at a point in time after the end of the predetermined time period, or when no time period is designated) are submitted to the ACH network for settlement (150, 160, 170, 180, 190, FIG. 4);

ii) ACH-ineligible transactions that are beyond the trial period are submitted to the matching protocol that searches for image files that match data files (290, FIG. 4);

iii) ACH-eligible transactions that are not beyond the trial period (i.e pass through decision point 810 at a point in time prior to the end of the predetermined trial period) are submitted to the matching protocol to match image files to data files (290, FIG. 4);

iv) ACH-ineligible transactions that are not beyond the trial period are submitted to matching protocol to match image files to data files (290, FIG. 4).

After matching, ACH-eligible transactions can be processed either through typical settlement of ACH transactions or they can be processed through image exchange.

Store Validation Control

Another opportunity for error can occur when a merchant is using this system for some but not all of its store locations. The transactions from a non-participating location may inadvertently be included in the transactions submitted in the merchant's MICR file.

To prevent these errant transactions from being processed, the system and method incorporates a control measure of checking that the "Store ID" in the transaction records from the MICR file sent to the TPPP (120) is a store for which the merchant has contracted services prior to processing the transactions. This control is facilitated by the use of a store table in which is stored a unique record for each store Merchants assign a store number for each of their stores and provide this store number to customer service for the TPPP, and this merchant-assigned store number is then stored in a store table in association with an indication as to whether each store is supposed to have its transactions processed through this system and method. When the validation is performed, if the store number in the MICR file from the merchant does not match a pre-established store number in the TPPP system, i.e. if the store number is not associated with an indication that the store's transactions are to be processed by this system and method, then items carrying that store number will not be processed further and will be reported to the merchant. The remainder of items from stores that are to be processed by the system, are processed accordingly. In this way, it is not necessary to reject the merchant's file, or all the transaction in the merchant's file; rather, those transactions that belong in the system proceed without delay, while the errant transactions are not processed by the system.

It should be noted that this system and method has been described in the context of a coordinated effort between merchants, a third party payment processor and a high-volume image scanning entity. The system may also function with additional or fewer parties and with other divisions of labor amongst the parties. For example, the matching, indexing and exception processing steps (290) are described as being done by the TPPP, but might instead be done by the imager or another entity. As another example, the third party payment processor might perform the scanning task. Such shifts in the division of labor would be facilitated with appropriate file transfer steps. Although an illustrative version of the device is shown, it should be clear that many modifications to the device may be made without departing from the scope of the invention.

We claim:

1. A method for processing paper checks, comprising:

a) receiving at a third party payment processor computer at least one data file containing a plurality of transaction records, each transaction record including MICR information for one paper check used in a transaction and an amount for the transaction, the transaction records being received without an image file;

b) identifying a first portion of the transaction records associated with an indication of an end of a trial period;

c) identifying a second portion of the transaction records that are not associated with any end of trial period;

d) scanning said batch of checks thereby creating a digital image of the checks and, for each said check, associating said image with said check's MICR information;

e) processing at the third party payment processor computer said check transactions according to type and associated trial period indicator according to all of the following rules:

i) ACH-eligible transactions found in the first portion that are beyond the trial period are submitted to the ACH network for settlement without first being submitted to a matching protocol that searches for image files that match data files;

ii) ACH-ineligible transactions found in the first portion that are beyond the trial period are submitted to the matching protocol to match image files to data files before being submitted for settlement;

iii) ACH-eligible transactions found in the first portion that are not beyond the trial period are submitted to the matching protocol to match image files to data files before being submitted for settlement;

iv) ACH-ineligible transactions found in the first portion that are not beyond the trial period are submitted to the matching protocol to match image files to data files before being submitted for settlement;

v) ACH-ineligible transaction records found in the second portion are submitted to the matching protocol to match image files to data files before being submitted for settlement; and vi) ACH-eligible transaction records found in the second portion are submitted to the ACH network for settlement without first being submitted to the matching protocol to match image files to data files.

2. A system for processing paper checks, comprising:

a) means for receiving at a third party payment processor computer a MICR file containing data captured by a merchant, said MICR file representing purchase transactions made by check, said MICR file including a transaction amount associated with MICR information;

b) means for associating each transaction record in a first portion of transaction records with an indication of the end of a trial period while not associating transaction records in a second portion of the transaction records with an end of trial period;

c) means for creating a digital image of the check;

d) means for associating said image with said check's MICR information;

e) means for processing said check transactions at the third party payment processor computer according to type and associated trial period indicator according to all of the following rules:

i) ACH-eligible transactions found in the first portion that are beyond the trial period are submitted to the ACH network for settlement without first being submitted to a matching protocol that searches for image files that match data files;

ii) ACH-ineligible transactions found in the first portion that are beyond the trial period are submitted to the matching protocol to match image files to data files before being submitted for settlement;

iii) ACH-eligible transactions found in the first portion that are not beyond the trial period are submitted to the matching protocol to match image files to data files before being submitted for settlement;

iv) ACH-ineligible transactions found in the first portion that are not beyond the trial period are submitted to the matching protocol to match image files to data files before being submitted for settlement;

v) ACH-ineligible transaction records found in the second portion are submitted to the matching protocol to match image files to data files before being submitted for settlement; and vi) ACH-eligible transaction records found in the second portion are submitted to the ACH network for settlement without first being submitted to the matching protocol to match image files to data files.

3. A method for processing paper checks, comprising the steps of:

a) capturing, using a point of sale device, an amount of a transaction and associating that amount in a transaction record with MICR information for each paper check;

b) sending a transaction data file containing a plurality of said transaction records to a third party payment processor computer, the transaction data file being without images of the paper checks;

c) associating a store identifier with each transaction record;

d) establishing a list of participating stores;

e) scanning said paper checks thereby creating a digital image of the paper checks and, for each said paper check, associating said digital image with said check's MICR information in an image record;

f) determining at the third party payment processor computer whether each transaction record is a participating store transaction record or a non-participating store transaction record by examining if the store identifier associated with each transaction record matches an entry on the list of stores;

g) for participating store transaction records, i) processing the ACH-ineligible transactions by comparing said image records with said transaction records to find matches, and ii) processing the ACH-eligible transactions by submitting to the ACH network for settlement without first comparing image files with data files; and h) for non-participating store transaction records, not processing the transactions for payment.

4. The method of claim 3, wherein the step of associating a store identifier with each transaction record further comprises inserting a store number into each transaction record.

5. The method of claim 3, wherein a plurality of store identifiers are assigned to a single merchant, further wherein a first set of the plurality of store identifiers assigned to the single merchant are found in the list of participating stores and wherein a second set of the plurality of store identifiers assigned to the single merchant are not found in the list of participating stores.

6. A method for processing paper checks, comprising:

a) receiving, at a third party payment processor computer, at least one transaction data file containing a plurality of transaction records with each transaction record containing an amount of a transaction that used a paper check and MICR information extracted from the paper check;

b) associating, at the third party payment processor computer, a first portion of the transaction records with an indication of an end of a trial period;

c) receiving, at the third party payment processor computer, a check image file containing i) a plurality of digital check images generated by scanning the paper checks, and ii) MICR information associated with each of the digital check images;

d) determining, at the third party payment processor computer, whether each transaction record is ACH-eligible or ACH-ineligible;

e) submitting, from the third party payment processor computer, ACH-ineligible transaction records and ACH-eligible transaction records that are not beyond the trial period to a matching protocol that matches the MICR information in a submitted transaction record to matching MICR information associated with a matched digital check image found in the check image file; and f) submitting, from the third party payment processor computer, ACH-eligible transaction records that are beyond the trial period to the ACH network for settlement without submission to the matching protocol;

wherein a second portion of the transaction records are not associated with any end of trial period, wherein ACH-ineligible transaction records found in the second portion are submitted to the matching protocol and further wherein ACH-eligible transaction records found in the second portion are submitted to the ACH network for settlement without submission to the matching protocol.

7. The method of claim 6, wherein the step of associating, at the third party payment processor computer, a first portion of the transaction records with an indication of the end of the trial period further comprises reading a date stored in the transaction record.

8. The method of claim 6, wherein the step of associating, at the third party payment processor computer, a first portion of the transaction records with an indication of the end of the trial period further comprises identifying a store identifier for each transaction records and further identifying the end of trial period that is associated with the identified store identifier.

9. The method of claim 6, wherein the step of associating, at the third party payment processor computer, a first portion of the transaction records with an indication of the end of the trial period further comprises identifying a merchant identifier for each transaction records and further identifying the end of trial period that is associated with the identified merchant identifier.

* * * * *

UNITED STATES PATENT AND TRADEMARK OFFICE
CERTIFICATE OF CORRECTION

PATENT NO. : 8,126,807 B2
APPLICATION NO. : 12/283524
DATED : February 28, 2012
INVENTOR(S) : Kari Hawkins et al.

It is certified that error appears in the above-identified patent and that said Letters Patent is hereby corrected as shown below:

Title page 2 Item 56
Column 2 (Other Publications)
Line 2
Delete "Retaile" and insert --Retail--, therefor.

Signed and Sealed this
Twelfth Day of March, 2013

Teresa Stanek Rea
*Acting Director of the United States Patent and Trademark Office*